United States Patent [19]

Pirrung et al.

[11] Patent Number: 5,648,697

[45] Date of Patent: Jul. 15, 1997

[54] PRESSURE SEALED TRANSDUCER FOR AUTOMOTIVE VEHICLES

[75] Inventors: Jurgen Pirrung, Erligheim; Reinhard Stumpe, Neuhausen; Gerhard Grohmann, Asperg, all of Germany

[73] Assignee: ITT Automotive Europe GmbH, Frankfurt, Germany

[21] Appl. No.: 602,851

[22] PCT Filed: Aug. 3, 1994

[86] PCT No.: PCT/EP94/02573

§ 371 Date: Feb. 27, 1996

§ 102(e) Date: Feb. 27, 1996

[87] PCT Pub. No.: WO95/06937

PCT Pub. Date: Mar. 9, 1995

[30] Foreign Application Priority Data

Aug. 28, 1993 [DE] Germany ............ 43 29 055.8

[51] Int. Cl.$^6$ ............................................. H01L 41/08
[52] U.S. Cl. ............................................. 310/338
[58] Field of Search ............................ 310/311, 328, 310/338, 366; 73/DIG. 4

[56] References Cited

U.S. PATENT DOCUMENTS 2,917,642 12/1959 Wright et al. ............ 310/338
3,171,989 3/1965 Hatchek ............ 310/338
4,441,044 4/1984 Ruckenbauer et al. ............ 310/338
4,712,036 12/1987 Gurich ............ 310/338 X

FOREIGN PATENT DOCUMENTS 3604439 8/1987 Germany .
3826799 2/1990 Germany .
1732500 7/1992 U.S.S.R. .

OTHER PUBLICATIONS

Search Report of the German Patent Office for Application No. P4329055.8.
English Translation of the International Preliminary Examination Report of Application PCT/EP94/02573.

Primary Examiner—Mark O. Budd
Attorney, Agent, or Firm—J. Gordon Lewis; Thomas N. Twomey

[57] ABSTRACT

The present invention relates to a transducer with a piezo-electric crystal for parking aids in automotive vehicles. Such transducers must be sealed against steam jets. This object is achieved by the present invention by means of a plug including projections forming an evacuatable chamber in conjunction with the inner wall of a housing bowl. Developments of the present invention relate to the protection and sealing of the diaphragm retainer, which is part of the transducer, against moisture and mechanical displacement due to vibrations and other environmental influences.

9 Claims, 1 Drawing Sheet

5,648,697

PRESSURE SEALED TRANSDUCER FOR AUTOMOTIVE VEHICLES

TECHNICAL FIELD

The present invention relates to transducers, and more particularly relates to piezoelectric transducers.

BACKGROUND OF THE INVENTION

A transducer of this type is generally disclosed in German patent application, No. 38 24 799.

It is required in such transducers that moisture is prevented from entering the interior of the transducer, so that the cemented piezoceramic plate and the associated electronic component parts and electrical connections will not be damaged. In addition, mechanical damping must not be impaired. More particularly, it is imperative that a transducer of this type is sealed against moisture even if it is subjected to the action of a steam-jet cleaner.

The previously used transducers of the type satisfied these requirements only insufficiently.

Therefore, an object of the present invention is to provide a generic transducer having an improved seal behavior with respect to extreme pressure and temperature.

Thus, the basic principle of the present invention is that a chamber is provided within the surface to be sealed which is relieved from pressure. Naturally, the surface of the projections is smaller than the total surface of the plug so that a larger surface pressure can be provided without impairing the mounting of the plug into the housing. This increased surface pressure in proximity to the projections with respect to the inner wall of the housing contributes to an improved sealing of the housing interior relative to the pressurized hot steam.

Because it is desirable that the diaphragm retainer is accessible to the environment and, thus, is exposed to moisture, in a preferred embodiment of the present invention pressure relief is also effected by the radial bores extending to the outside surface of the diaphragm retainer. Moisture under pressure is drawn outwardly through the radial bore and the apertures so that the adjacent surface of the diaphragm retainer is protected against moisture.

According to a preferred aspect of the present invention, the radial bore and the aperture terminate into the same chamber so that evacuation can be effected from the outside through the two openings up to the surface of the diaphragm retainer.

The sealing behavior is further improved and, additionally, a displacement of the diaphragm retainer in the longitudinal direction of the plug is prevented mechanically.

According to still another preferred aspect of the present invention, the sealing effect can be increased by the provision of a plurality of chambers. In addition, mounting of the plug is thereby simplified because a plurality of chambers are formed over the periphery of the plug. The walls of the chambers exert an increased surface pressure on the inside wall of the housing but, simultaneously, permit a comparatively simple mounting of the plug into the housing interior.

To minimize the influence of moisture on both the outside surface of the plug and the inside surface of the diaphragm retainer, radial bores terminate into a chamber.

Preferably circumferential projections are received and locked in the grooves of the diaphragm retainer.

The ventilation effect, which additionally aids in removing the fluid that entered and decreasing a pressure that developed in the chamber, can be increased by offsetting the radial bores and the apertures terminating into the first chamber. To this end, the boundary surfaces between the environment and the chamber or the outside surface of the diaphragm retainer are increased, and the offset positioning of apertures and radial bores virtually prevents the direct ingress of moisture. It is of course favorable that at least one of the bores extends vertically downwardly in the mounted condition to facilitate the removal of moisture.

The plug, which is formed of an elastic material such as silicone, can also be used for the elastic accommodation of a printed circuit board. The plug and the features indicated hereinabove will aid in protecting the housing chamber against moisture and other environmental influences.

DETAILED DESCRIPTION OF THE PREFERRED EMBODIMENT

Figure 1:
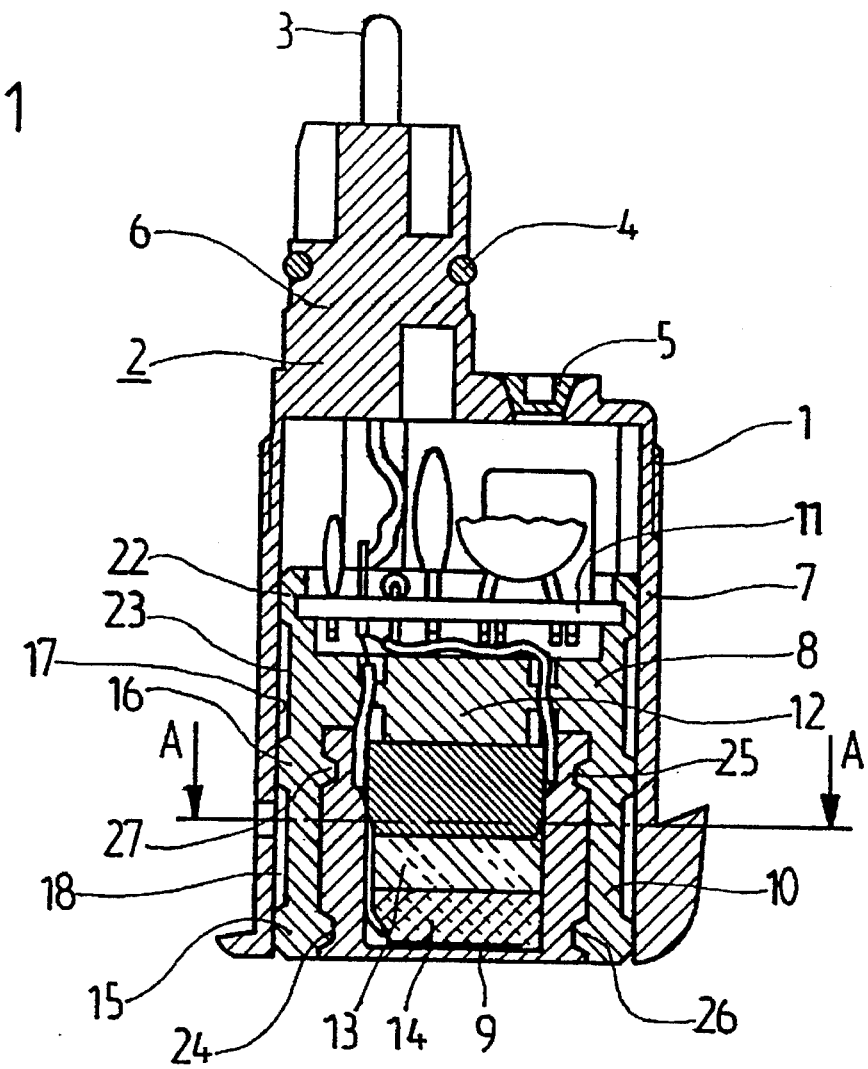
FIG. 1 is a longitudinal cross-sectional view of a transducer according to the present invention.
Figure 2:
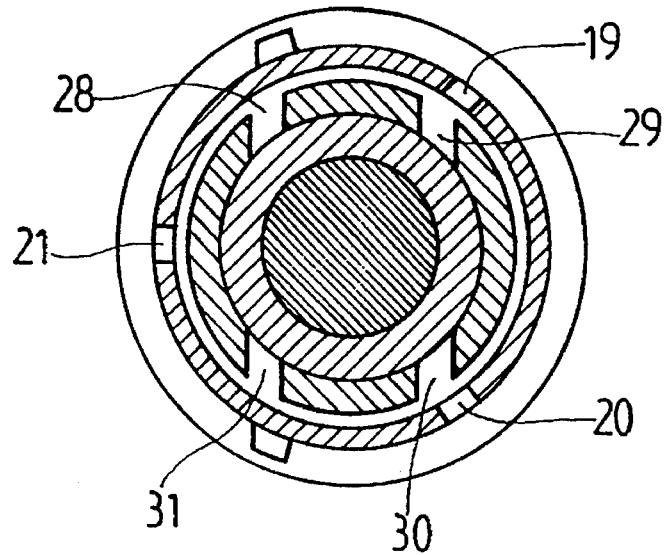
FIG. 2 is a cross-section taken along the level A—A through the transducer of FIG. 1.

The transducer fixed by way of a catch 1 has a contact plug 3 as a connection to the outside. For example, the transducer may be a piezoelectric transducer which is used as a transmitter and receiver for a parking aid system of an automotive vehicle. The contact plug 3 is sealed to the outside by a sealing ring 4. If necessary, a closure means 5 in the housing 2 permits access to the interior of the housing, for example, to insert structural elements or to align an oscillating circuit, more particularly a trimming coil.

The housing 2 includes a plug attachment 6 and an outwardly open housing bowl 7 for accommodating the structural elements of the transducer. To seal the housing bowl towards the outside, a plug 8, which is substantially made of an elastic material, more particularly silicone, is press fitted to the housing bowl. Plug 8 bears against the inner walls of the housing bowl 7 by way of radial forces. Plug 8 accommodates a diaphragm retainer 10, which carries a piezoelectric plate 9, and a printed circuit board 11 with electronic components. These components serve as an oscillating circuit for the electrical damping, for example. More particularly, the diaphragm retainer can be made of aluminum and can have a thin bottom behind which the piezoelectric plate 9 is arranged so as to be shielded from the outside. The piezoelectric plate is isolated from the plug by a sealing insert 12, made of silicone, for example, and one or, if necessary, two aerated plastics discs 13, 14. The piezoelectric plate 9 is connected to the electronic circuit on the printed circuit board 11 by electric connecting lines.

Moisture which is subject to high pressure, for example when a steam jet is directed to the diaphragm retainer 10, must be reliably prevented from moving far into the interior of the housing through the boundary surfaces between the diaphragm retainer 10, the plug 8, and the housing bowl 7. This prevents the electric circuits on the printed circuit board 11 or on the piezoelectric plate 9 from being damaged or the mechanical damping between the piezoelectric plate 9 and the sealing insert 12 from being impaired.

Mainly, this is achieved by a first circumferential annular bead 15 and a second circumferential annular bead 16, the beads forming a first circumferential chamber 18 along with the inner wall 17 of the housing bowl 7. Thus, the beads are so high in the dismounted condition of the plug 8 that a first annular circumferential chamber 18 is reliably formed when the plug 8 is mounted into the housing bowl 7. For the sake of clarity, the chamber 18 is shown with a comparatively large depth. However, it is sufficient for implementing the present invention that a circumferential chamber is formed which is connected to the environment of the transducer 2 through one or a plurality of apertures 19, 20, 21 and can thus be ventilated. This way, the fluid which exists in the boundary surface between the housing bowl 7 and the plug 8 due to jet pressure or capillary forces, can be discharged to the open air through the apertures 19 to 21. In addition, the projections 15, 16 provided as beads cause locally a very high surface pressure between the plug 8 and the inner wall 17 of the housing bowl 7, whereby the sealing effect of the plug is still increased. Mounting is simplified, and sealing is still improved to some extent in the transducer 2 by using a third projection 22. A second circumferential chamber 23 is thereby provided which basically corresponds in its shape to that of the first chamber 18.

At the level of the second bead 23, the plug also accommodates the printed circuit board 11 which is thereby rigidly clamped in the plug 8 and is prevented from detaching from the plug, even if the transducer 2 is exposed to vigorous shaking movements. Therefore, the housing bowl does not require additional projections or notches to prevent a longitudinal movement of the plug 8 with respect to the housing 7. This permits manufacturing the housing 7 as a simple injection-molded part.

To increase the sealing effect of the plug 8 with respect to the diaphragm retainer 10 at the corresponding boundary surface and to prevent a movement of the diaphragm retainer 10 with respect to the plug 8 in the longitudinal direction of the diaphragm, the diaphragm retainer includes two circumferential grooves 24, 25 into which mating attachments 26, 27 of the plug 8 project so as to form undercuts. These attachments can be formed by the elastic material when the diaphragm retainer is mounted into the plug 8. However, the attachments can also be provided in the dismounted condition of the plug already to achieve an increased action of force of the attachments on the bottom of the grooves. Usually, the attachments are circularly circumferential, but this shape is not imperative. Instead, the attachments can also be individual projections or knobs lying annularly one behind the other. To provide a sufficient ventilation of the outer surface of the diaphragm retainer, radial bores 28, 29, 30, 31 extend from the first chamber 18 through the side wall of the plug 8, thereby establishing a connection to the environment of the transducer 2 by way of the first chamber 18 and the corresponding apertures 19 to 21.

The assembly of the transducer is effected by the plug being equipped with the diaphragm retainer 10 on one side and by the printed circuit board 11 on the other side. These two assembly units are mounted into corresponding recesses in the plug. The electric circuit on the printed circuit board is connected to the contact plug 3 of the housing 2. Subsequently, the plug 8 is mounted into the housing bowl 7.

We claim:

1. A transducer of the type including a diaphragm and a diaphragm retainer which carries an oscillator wherein said diaphragm retainer is mounted into the opening of a plug made of an elastic material such that the bottom of the diaphragm retainer provides ease of access, and the plug is mounted into an open end of a housing, comprising at least two spaced circumferential projections extending from said plug, wherein said projections form walls of a first circumferential chamber.

2. A transducer as claimed in claim 1, wherein the hollow-cylindrical wall of the said plug includes a cylindrical wall having at least one radial bore which is spaced from the two circumferential projections.

3. A transducer as claimed in claim 1, wherein said housing includes at least one radial aperture and the at least one radial bore and the radial apertures terminate into a first chamber.

4. A transducer as claimed in claim 2, wherein, the diaphragm retainer inclues at least two spaced circumferential grooves which are arranged on either side of the radial bores of said cylinder wall in the mounted condition of the transducer.

5. A transducer as claimed in claim 1, wherein the plug has three projections forming the first and a second chamber.

6. A transducer as claimed in claim 5, wherein the radial bores of said cylinder wall and the radial apertures terminate into a first chamber of two chambers said first chamber being arranged in proximity to the open end of the housing bowl.

7. A transducer as claimed in claim 4, wherein a side wall of the plug opening has two circumferential attachments which are associated with the grooves of said diaphragm retainer.

8. A transducer as claimed in claim 3, wherein the radial bores of said cylindrical walls and the radial apertures are offset in relation to each other.

9. A transducer as claimed in claim 1, wherein an end of the plug remote from the diaphragm retainer carries an electric circuit having its electrical components project into a housing chamber that is defined by the plug and the housing.

* * * * *

UNITED STATES PATENT AND TRADEMARK OFFICE
CERTIFICATE OF CORRECTION

PATENT NO. : 5,648,697
DATED : 07/15/97
INVENTOR(S) : Pirrung, et al.

It is certified that error appears in the above-indentified patent and that said Letters Patent is hereby corrected as shown below:

Column 4, line 27, change "inclues" to --includes--.

Signed and Sealed this

Fourteenth Day of October, 1997

Attest:

BRUCE LEHMAN

*Attesting Officer*            *Commissioner of Patents and Trademarks*